(12) United States Patent
Ikeda et al.

(10) Patent No.: US 7,053,298 B2
(45) Date of Patent: May 30, 2006

(54) ELECTRIC CONNECTING BOX

(75) Inventors: Tomohiro Ikeda, Shizuoka (JP); Yasutaka Miyazaki, Shizuoka (JP); Ko Watanabe, Aichi (JP); Takenori Tsuchiya, Aichi (JP); Shigeki Matsumoto, Shizuoka (JP)

(73) Assignees: Yazaki Corporation, Tokyo (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/970,183

(22) Filed: Oct. 22, 2004

(65) Prior Publication Data

US 2005/0087355 A1  Apr. 28, 2005

(30) Foreign Application Priority Data

Oct. 24, 2003  (JP)  ............................. 2003-364512

(51) Int. Cl.
*H02G 3/08* (2006.01)

(52) U.S. Cl. ............................. 174/50; 174/60; 174/59; 174/52.1; 439/76.1; 361/736

(58) Field of Classification Search .................. 174/50, 174/60, 59, 61, 58, 52.1, 52.4; 220/3.2, 4.02; 439/76.2, 79, 76.1, 949, 632; 361/736, 651
See application file for complete search history.

(56) References Cited

U.S. PATENT DOCUMENTS

| 5,822,189 | A | * | 10/1998 | Isshiki ........................ 361/736 |
| 6,541,700 | B1 | * | 4/2003 | Chiriku et al. ................ 174/50 |
| 6,610,926 | B1 | * | 8/2003 | Chiriku et al. ................ 174/60 |

FOREIGN PATENT DOCUMENTS

| JP | 8-107615 | 4/1996 |
| JP | 9-260103 | 10/1997 |
| JP | 11-205953 | 7/1999 |
| JP | 2000-261935 | 9/2000 |
| JP | 2001-218338 | 8/2001 |

* cited by examiner

*Primary Examiner*—Dhiru R. Patel
(74) *Attorney, Agent, or Firm*—Armstrong, Kratz, Quintos, Hanson & Brooks, LLP

(57) ABSTRACT

Preventing an electric connecting box having an upper cover and a lower cover, which can prevent the upper cover from approaching the lower cover over a limit when an electric component is mounted on the upper cover, the electric connecting box 1 is provided with an upper cover 2, a lower cover 3, a middle cover 4, a printed wire board 5, a wiring board 6 and a shield plat 7. The upper cover 2 is mounted on the lower cover 3. The lower cover 3 has a first strut 20 abutting on the shield plate 7. The first strut 20 supports the upper cover 2 through the shield plate 7 and the wiring board 6.

6 Claims, 8 Drawing Sheets

ELECTRIC CONNECTING BOX

The priority application Number Japan Patent Application No. 2003-364512 upon which this patent application is based is hereby incorporated by reference.

BACKGROUND OF THE INVENTION

1. Field of the Invention

This invention relates to an electric connecting box for mounting an electric component such as a relay and a fuse.

2. Description of the Related Art

Generally, a various electric connecting box is installed in for example an electric vehicle, including a hybrid car, for connecting electrically a battery and an inverter. The electric connecting box has a fuse, a relay and a bus bar, and is called as a junction block, a fuse block or a relay box.

The aforesaid electric connecting box includes an upper cover, a lower cover being mounted to the upper cover and a wiring board as a circuit unit to be received between the upper cover and the lower cover. An electric component, such as a fuse and a relay, is mounted on the upper cover. Then, the upper cover is provided with a junction terminal for connecting a terminal of the electric component and the wiring board. A connector coupling with a connector of a wire harness is mounted on the lower cover. The upper cover and the lower cover are formed into a box-shape by joining together.

The wiring board is received between the upper cover and the lower cover those are joined together as mentioned above. The wiring board connects electrically the terminal of the connector mounted on the lower cover and the terminal of the electric component mounted on the upper cover in accordance with a predetermined wiring pattern.

By mounting the connector on the lower cover, mounting the junction terminal on the upper cover, joining the upper cover and the lower cover so as to receive the wiring board, and mounting the aforesaid electric component on the upper cover, the electric connecting box is assembled.

Objects to be Solved

According to the aforesaid electric connecting box, when the electric component to be mounted on the upper cover would be enlarged, relatively large force for press-fitting the electric component on the upper cover is required to connect the terminal of the electric component and the junction terminal. It may make an operator load operator's weight on the electric component for mounting that on the upper cover. If the electric component is press-fitted on the upper cover by relatively large force, such as the operator's weight, the upper cover may be deformed so as to make a space between the upper cover and the lower cover narrower.

When the upper cover is deformed so as to make a space between the upper cover and the lower cover narrower, the upper cover may push the wiring board and bend the wiring board. Thereby, the wiring board as a circuit unit could not securely connect the terminals of the connector and the electric component in accordance with a predetermined wiring pattern because of unstable electrical connection.

When the upper cover is more deformed so as to make a space between the upper cover and the lower cover narrower, the upper cover may be broken in the worst case.

To overcome the above drawback, an object of this invention is to provide an electric connecting box having an upper cover and a lower cover for receiving a circuit unit between the upper cover and the lower cover, which can prevent the upper cover from approaching the lower cover over a limit when mounting an electric component on the upper cover.

How to Attain the Object

In order to attain the object, an electric connecting box according to the present invention is an electric connecting box, having an upper cover for mounting an electric component thereon and a lower cover being joined to the upper cover for receiving a first circuit unit between the upper cover and the lower cover, and includes a first strut extending from one of the upper cover and the lower cover toward the other of the upper cover and the lower cover, and the first strut limits the upper cover from approaching to the lower cover when the electric component is mounted on the upper cover.

An electric connecting box according to the present invention is an electric connecting box, having an upper cover for mounting an electric component thereon and a lower cover being joined to the upper cover for receiving a first circuit unit between the upper cover and the lower cover, and includes a first strut extending from the lower cover toward the upper cover and a second strut extending from the upper cover toward the lower cover, and the first strut and the second strut both limit the upper cover from approaching to the lower cover when the electric component is mounted on the upper cover.

The electric connecting box according to the present invention is specified in the aforesaid electric connecting box by that a plurality of electric components can be mounted on said upper cover, and the first strut limits a point of the upper cover between at least two of the plurality of electric components from approaching to the lower cover.

The electric connecting box according to the present invention is further specified in the aforesaid electric connecting box by that further includes a middle cover between the upper cover and the lower cover to be joined to the upper cover and the lower cover, and a second circuit unit being disposed between the middle cover and the upper cover and connecting electrically with the electric component, and the first circuit unit is disposed between the middle cover and the lower cover.

According to the electric connecting box mentioned above, the first strut extending from one of the upper cover and the lower cover toward the other of the upper cover and the lower cover prevents the upper cover from approaching the lower cover when the electric component is mounted on the upper cover. When the electric component is mounted on the upper cover, the upper cover can be prevented from deforming so as to make a space between the upper cover and the lower cover narrower. Thus, when the electric component is mounted on the upper cover, the upper cover can be prevented from approaching the lower cover over a limit.

According to the electric connecting box mentioned above, the first strut extending from the lower cover toward the upper cover and the second strut extending from the upper cover toward the lower cover both prevent the upper cover from approaching the lower cover when the electric component is mounted on the upper cover. When the electric component is mounted on the upper cover, the upper cover can be prevented from deforming so as to make a space between the upper cover and the lower cover narrower. Thus, when the electric component is mounted on the upper cover, the upper cover can be prevented from approaching the lower cover over a limit.

According to the electric connecting box mentioned above, the first strut prevents the point of the upper cover between at least two of the plurality of electric components from approaching the lower cover. When the at least two electric components are mounted on the upper cover, the first strut can prevent the upper cover from deforming so as to make a space between the upper cover and the lower cover narrower. Thus, when the electric component is mounted on the upper cover, the upper cover can be prevented from approaching the lower cover over a limit.

According to the electric connecting box mentioned above, the second circuit unit is additionally received between the upper cover and the lower cover. Thereby, the electric connecting box can be applied for multiple circuit systems. The first circuit unit and the second circuit unit may be connected electrically together and may be separated electrically to each other.

The above and other objects and features of this invention will become more apparent from the following description taken in conjunction with the accompanying drawings.

DESCRIPTION OF THE PREFERRED EMBODIMENT

An electric connecting box 1 according a first embodiment of the present invention will be described with reference to FIG. 1–4. The electric connecting box 1 shown in FIG. 1 is installed in a hybrid car, which can be driven both by an electric motor and an engine, as a vehicle so as to be mounted on a dash panel of the hybrid car.

Figure 1:
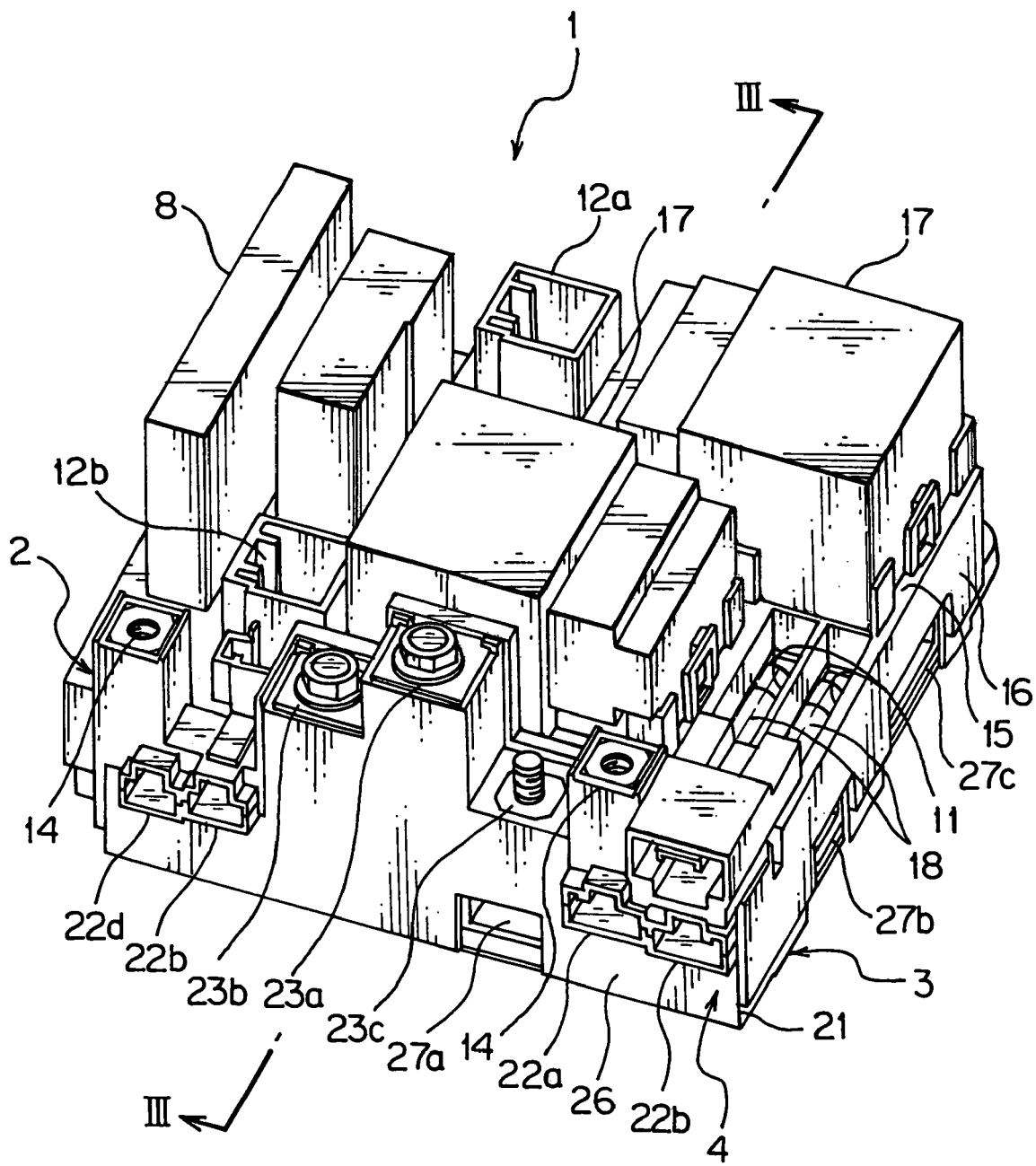
FIG. 1 is a perspective view of the first embodiment of an electric connecting box according to the present invention.
Figure 2:
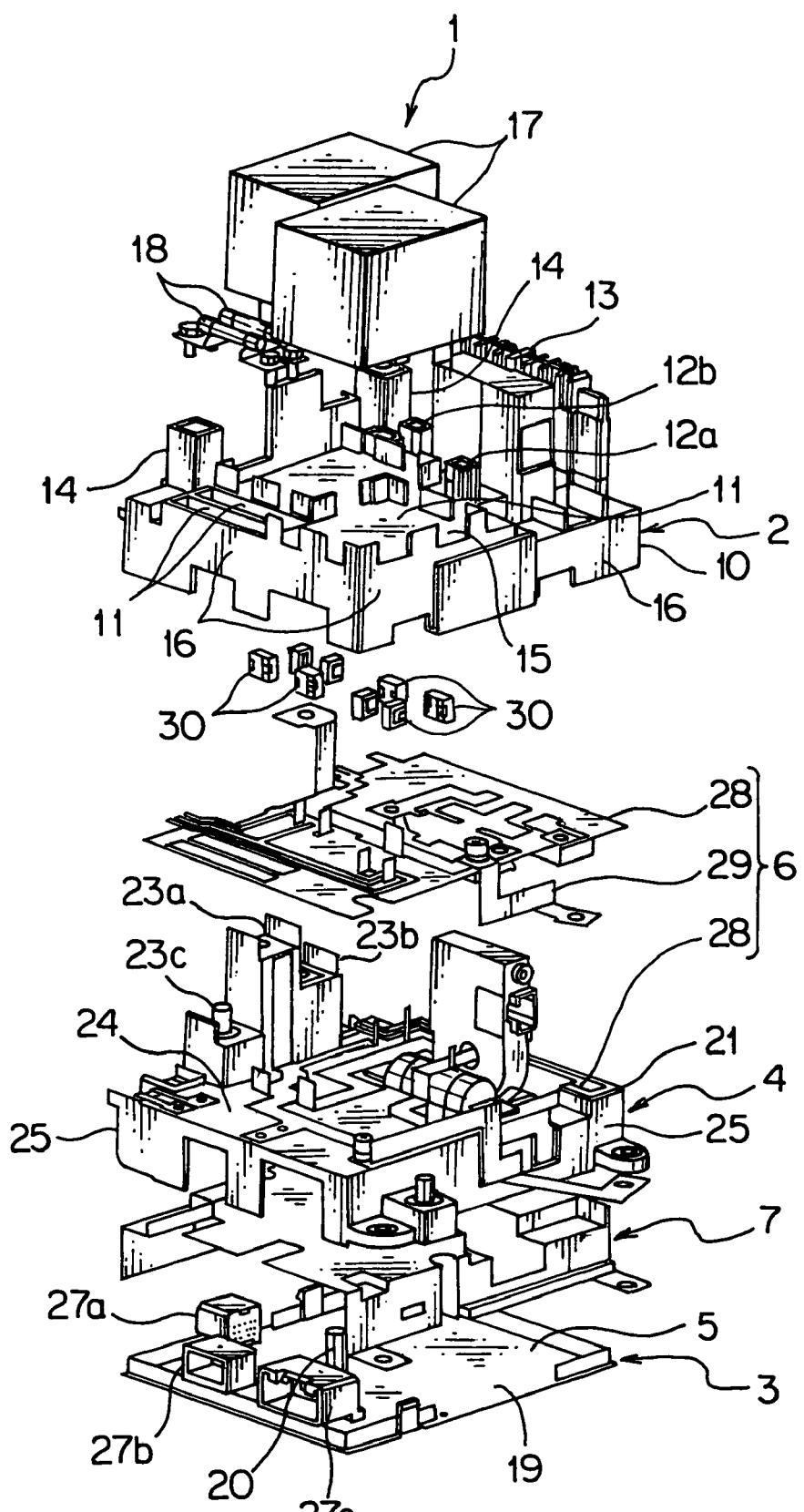
FIG. 2 is an exploded perspective view of the electric connecting box shown in FIG. 1.

As shown in FIG. 1, 2, the electric connecting box has an upper cover 2, a lower cover 3, a middle cover 4, a printed wire board 5 (shown in FIG. 2) as the first circuit unit, a wiring board 6 (shown in FIG. 2) as the second circuit unit, a shield plate 7 (shown in FIG. 2) and a service plug 8 (shown in FIG. 1). The upper cover 2 made of an insulating synthetic resin is provided with a bottom-opened box-shape cover body 10, a plurality of mounting portions 11 disposed on the cover body 10, a plurality of connectors 12a, 12b disposed in the cover body, a service plug mounting portion 13 and a terminal block 14.

The cover body 10 is formed integrally with a plate-shape top wall 15 and a plurality of side walls 16 standing from outer edges of the top wall 15. Four mounting portions 11 are provided in the embodiment. The mounting portions 11 are disposed at the top wall 15 of the cover body 10. Two of the mounting portions 11 are for mounting a relay 17 as the electric component. The relay 17 is a relative large component. The other two mounting portions 11 are for mounting fuses 18. Thus, the electric connecting box 1 includes two relays 17 and two fuses 18 as electric components.

At least two connectors 12a, 12b are provided in the embodiment. The connectors 12a, 12b are disposed at the top wall 15 of the cover body 10. The connectors 12a, 12b are used for connecting to a battery of the hybrid car. The service plug mounting portion 13 is disposed at the top wall 15 of the cover body 10. The service plug 8 is mounted on the service plug mounting portion 13.

The terminal block 14 is disposed at the top wall 15 of the cover body 10. The terminal block is for connecting an end portion of a later-described bus bar 28 of the wiring board 6 and a mating terminal (not shown) with a bolt and a nut, as same as a later-described terminal block 23a, 23b, 23c. The terminal block 14 is connected with a braided wire of a shield wire from an inverter installed in the hybrid car.

The lower cover 3 made of an insulating synthetic resin is formed integrally with a plate-shape cover body 19 and a first strut 20 standing from the cover body 19. The lower cover 3 is disposed at edge of the side walls 16 of a far side from the top wall 15 to have a space in parallel with the top wall 15 of the upper cover 2. Then, the upper cover 2 and the lower cover form a box-shape with a space inside by assembling together. The lower cover 3 is mounted on the middle cover 4. The middle cover 4 is mounted on the upper cover 2. Thus, the lower cover 3 is mounted through the middle cover 4 on the upper cover 2.

The first strut 20 extends from the cover body 19 toward the top wall 15. In other word, the first strut 20 extends from the lower cover 3 toward the upper cover 2. The first strut 20 faces to a point K (shown in FIG. 3) between the two relays 17 of the upper cover 2 along a direction in that the cover body 19 faces to the top wall 15. The first strut 20 abuts on the shield plate 7. The first strut 20 limits the top wall 15 (specifically the point K) of the upper cover 2 from approaching to the cover body 19 of the lower cover 3 by abutting on the shield plate 7 so as to have the shield plate 7, the middle cover 4 and the wiring board 6 between the first strut 20 and the upper cover 2.

The middle cover 4 made of an insulating synthetic resin includes a bottom-opened box-shape cover body 21, a plurality of connectors 22a, 22b, 22c, 22d mounted on the cover body 22 and a plurality of terminal blocks 23a, 23b, 23c mounted on the cover body 21. The cover body 21 is formed integrally with a plate-shape top wall 24 and a plurality of side walls 25 standing from outer edges of the top wall 24.

The middle cover 4 is disposed between the upper cover 2 and the lower cover 3 so as to locate the top wall 24 in parallel to the top wall 15 and the cover body 19, and with spaces respectively between the top wall 15 and between the cover body 19, and touch the side walls 25 to the side walls 16. And the middle cover 4 is mounted on the upper cover 2 and the lower cover 3. Thereby, a space between the upper cover 2 and the lower cover is partitioned onto two spaces by the middle cover 4.

The plurality of connectors 22a, 22b, 22c, 22d are mounted on the side wall 25 of the cover body 21. One 22a of the plurality of connectors 22a, 22b, 22c, 22d is connected with a circuit (of activating side) for driving the relay 17. The other two connectors 22b, 22c are connected with a converting circuit for converting electric power source to 100 voltages. The electric power from the connectors 22b, 22c is converted to AC 100 voltages and supplied to an AC 100V plug (called also as a receptacle or a socket) provided in a room of the hybrid car. The other connector 22d is connected with an interlock circuit for detecting whether or not the service plug 8 is mounted on the service plug mounting portion 13.

The three terminal blocks 23*a*, 23*b*, 23*c* are provided in the embodiment. Two terminal blocks 23*a*, 23*b* are connected with an inverter of the hybrid car. The other terminal block 23*c* is connected with a DC/DC converter of the hybrid car.

Figure 3:
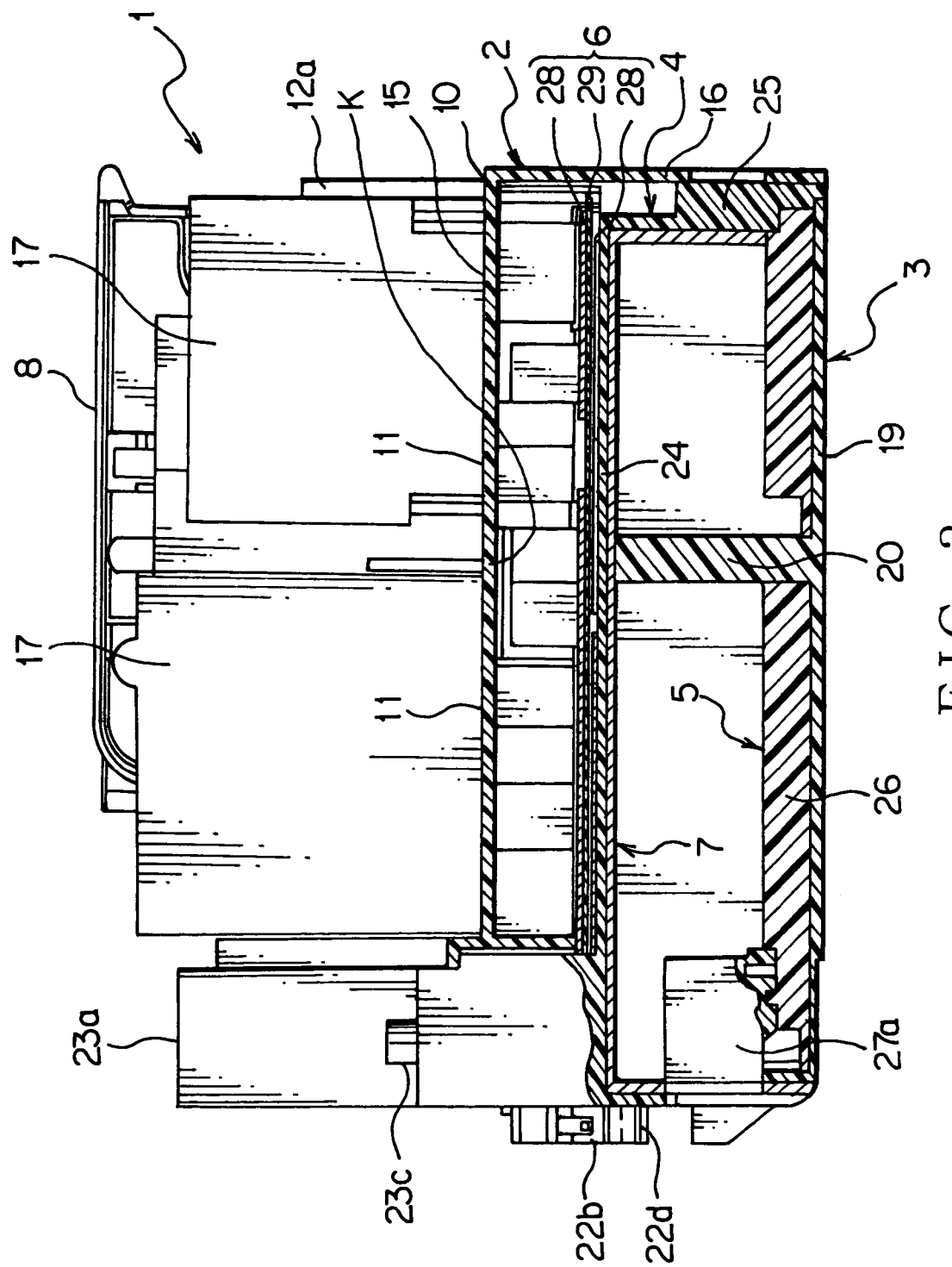
FIG. 3 is a partial sectional drawing taken along the line III—III in FIG. 1.
Figure 4:
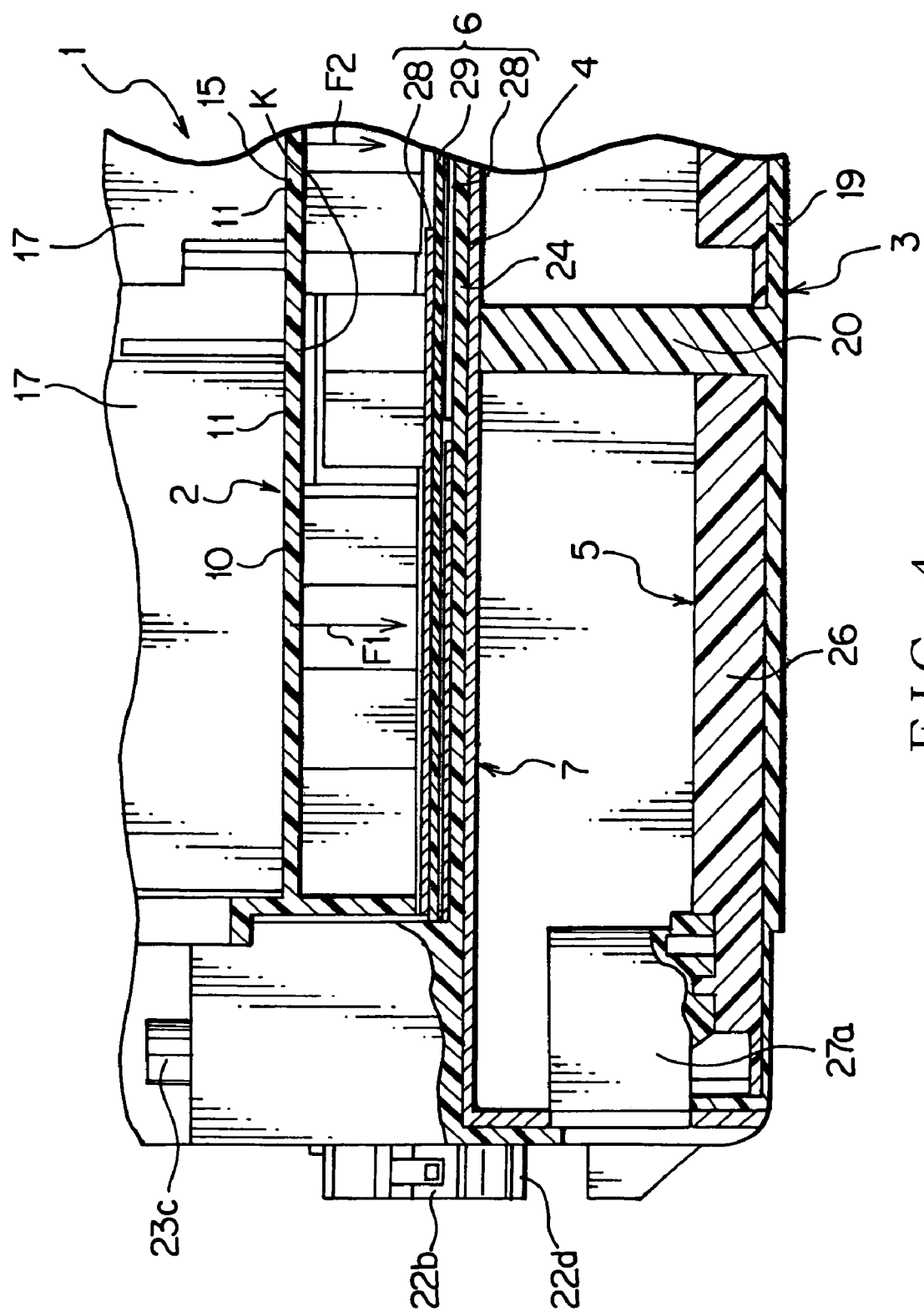
FIG. 4 is a partially expanded view of sectional area shown in FIG. 3.

The printed wire board 5 is received in a space between the lower cover 3 and the middle cover 4, i.e. between the lower cover 3 and the upper cover 2, as shown in FIG. 3. The printed wire board 5 is stacked on the cover body 19 of the lower cover 3, in parallel with the cover body 19 and the top walls 15, 24. The printed wire board 5 is provided with an insulating basic board 26, a not-shown conductive pattern formed on the basic board 26, not-shown electronic components mounted on the basic board 26 and a plurality of connectors 27*a*, 27*b*, 27*c* mounted on the basic board 26. The basic board 26 is stacked on the cover body 19 of the lower cover 3.

The conductive pattern made of electrical conductive metal such as a copper is adhered on a surface of the basic board. The connectors 27*a*, 27*b*, 27*c* are mounted on the basic board 26 so as to expose to outsides of the upper cover 2, the lower cover 3 and the middle cover 4. Terminals of the connectors 27*a*, 27*b*, 27*c* are connected electrically with the conductive pattern. One connector 27*a* is connected with an electronic control unit (ECU) controlling whole of electronic units installed at the hybrid car. The other connector 27*b* is connected with a thermistor as a detecting device for detecting each temperature of a plurality of battery cells structuring the aforesaid battery. The other connector 27*c* is connected with a heater for heating each cell and a cooling fan for cooling each cell. The cell can convert chemical energy to electric energy and convert electric energy to chemical energy. By connecting the plurality of cells in series, the aforesaid battery of the hybrid car is structured.

According to the above structure, the printed wire board 5 as the first circuit unit controls the heater and the cooling fan by an order of the ECU in accordance with temperature information detected by the thermistor for maintaining the temperatures of the battery cells in a predetermined range.

The wiring board 6 is received in a space between the middle cover 4 and the upper cover 2, i.e. between the lower cover 3 and the upper cover 2, as shown in FIG. 3. The wiring board 6 has a pair of bus bars 28 and an insulating base board 29. The wiring board 6 is structured by disposing the insulating base board 29 between the pair of bus bars 28 to stack the bus bars 28 and the insulating base board 29 on each other.

The insulating base board 29 of the wiring board 6 is stacked on the top wall 24 of the middle cover 4, in parallel with the cover body 19 and the top walls 15, 24. The top wall 15 of the upper cover 2 is disposed over the wiring board 6. The bus bar 28 is made of an electrical conductive metal sheet such as a brass. The bus bar 28 is connected electrically through a junction terminal 30 (shown in FIG. 2) with the relay 17 mounted on the mounting portion 11. The bus bar 28 is also connected electrically with the fuse 18 mounted on the mounting portion 11. The bus bar 28 is formed integrally with the service plug mounting portion 13 and terminals of the connectors 12*a*, 12*b*, 22*a*, 22*b*, 22*c*, 22*d* so as to connect electrically therewith. End terminals are provided at the terminal blocks 23*a*, 23*b*, 23*c*.

According to the aforesaid structure, the wiring board 6 as the second circuit connects the relays 17, the fuses 18, the batteries, the inverter, the service plug 13, DC/DC converter, the converting circuit for converting to AC100V, the interlock circuit and the circuit for driving the relay 17 in accordance with a predetermined pattern through the mounting portions 11, connectors 12*a*, 12*b*, 22*a*, 22*b*, 22*c*, 22*d*, and the terminal blocks 23*a*, 23*c*. Thus, the wiring board 6 as the second circuit unit is electrically independent from the printed wire board 5 as the first circuit unit.

The shield plate 7 is made of an electrical conductive sheet metal. The shield plate 7 is received in a space between the lower cover 3 and the middle cover 4, i.e. between the lower cover 3 and the upper cover 2, as shown in FIG. 3. The shield plate 7 covers a circuit pattern of the printed wire board 5 as the first circuit unit to be disposed with a gap between the circuit pattern of the printed wire board 5 and insulated electrically from the circuit pattern (not connected electrically). Thereby, the shield plate 7 prevents the circuit pattern of the printed wire board 5 from effects of electric power by high-voltage current from the inverter flowing in the bus bar 28 of the wiring board 6 as the second circuit unit 6.

The shield plate 7 discharges the electric power (electric noise), which intends to go into the circuit pattern of the printed wire board 5, to a panel of a vehicle body. The first strut 20 abuts on the shield plate 7 and the top wall 24 of the middle cover 4 stacks on the shield plate 7.

The service plug 8 is mounted in the service plug mounting portion 13. The service plug 8 connects a circuit of the wiring board 6 in accordance with the predetermined pattern when the service plug 8 is mounted in the service plug mounting portion 13. When the service plug 8 is dismounted in the service plug mounting portion 13, the circuit of the wiring board 6 is cut off. The service plug 8 is for cutting off the circuit in the electric connecting box to prevent electric shock when an operator connects and disconnects a circuit at the inverter side to/from the electric connecting box for maintenance.

The electric connecting box structured as mentioned above is assembled as follows. Firstly, the connectors 27*a*, 27*b*, 27*c* are mounted on the printed wire board 5. The printed wire board 5 is mounted in the lower cover 3. The middle cover 4 is mounted on the lower cover 3. One bus bar 28, the insulating base plate 29 and the other bus bar 28 are stacked in sequence on the middle cover 4. The junction terminal 30 is mounted on the bus bar 28. The upper cover 2 is mounted on the middle cover 4 and the lower cover 3. The fuse 18 and the relay 17 are mounted on the mounting portions 11 of the upper cover 2.

Since the relatively large relay 17 is mounted on the mounting portion 11, when terminals of the relay 17 are inserted into the junction terminals 30, a large force is required for pressing the relay 17 toward the upper cover 2. When an operator loads on the relay 17 with the operator's weight for mounting the relay 17 on the mounting portion 11, a large force acts on the upper cover 2 along arrows F1, F2 in FIG. 4. Because the first strut 20 extends from the lower cover 3 toward the upper cover 2 and abuts on the shield plate 7, the force along arrows F1, F2 is supported by the first strut 20.

Thus, the first strut 20 prevents the top wall 15 of the upper cover 2 from approaching the cover body 19 of the lower cover 3 (over the limit). Therefore, the first strut 20 prevent the upper cover from breakage.

The electric connecting box 1 assembled as mentioned above connects the printed wire board 5 with the ECU, the thermistor, the heater and the cooling fan through the connectors 27*a*, 27*b*, 27*c*. The wiring board 6 connects the relays 17, the fuses 18, the batteries, the inverter, the service plug 13, DC/DC converter, the converting circuit for converting to AC100V, the interlock circuit and the circuit for driving the relay 17. Thus, the electric connecting box 1 is installed in the hybrid car. The shield plate 7 is connected electrically with the panel of the vehicle body.

According to the embodiment, the first strut 20 extending from the lower cover 3 toward the upper cover 2 abuts on the shield plate 7 when the relay 17 is mounted on the upper cover 2. Thereby, the first strut 20 abuts on the upper cover 2 through the shield plate 7, the middle cover 4 and the wiring board 6. Therefore, the first strut 20 prevents the upper cover 2 from approaching the lower cover 3.

It is prevented that the upper cover 2 is deformed to make a space between the upper cover 2 and the lower cover 3 narrower, when the relay 17 is mounted on the upper cover 2. It is prevented that the upper cover 2 approaches the lower cover 3 over a limit, when the relay 17 is mounted on the upper cover 2. Thus, when mounting the relay 17, it can prevented that the upper cover 2 and the lower cover 3 are broken. The upper cover 2 can be prevented from abutting on the printed wire board 5 as the first circuit unit received in the upper cover 2 and the lower cover 3, so that electric reliability of the printed wire board 5 can be maintained.

The first strut 20 is disposed between the two relays 17. Thereby, the first strut 20 can prevent the point K of the upper cover 2 between the two relays 17 from approaching the lower cover 3. Therefore, the first strut 20 can prevent the upper cover 2 from deforming so as to make a space between the upper cover 2 and the lower cover 3 narrower, when the two relays 17 are mounted on the upper cover 2. Thus, the upper cover 2 and the lower cover 3 can be prevented from breakage and the printed wire board 5 can be prevented from deterioration of electric reliability.

The wiring board 6 is received between the upper cover 2 and the lower cover 3 in addition to the printed wire board 5. Thereby, the electric connecting box 1 can be used for multiple circuit systems.

Figure 5:
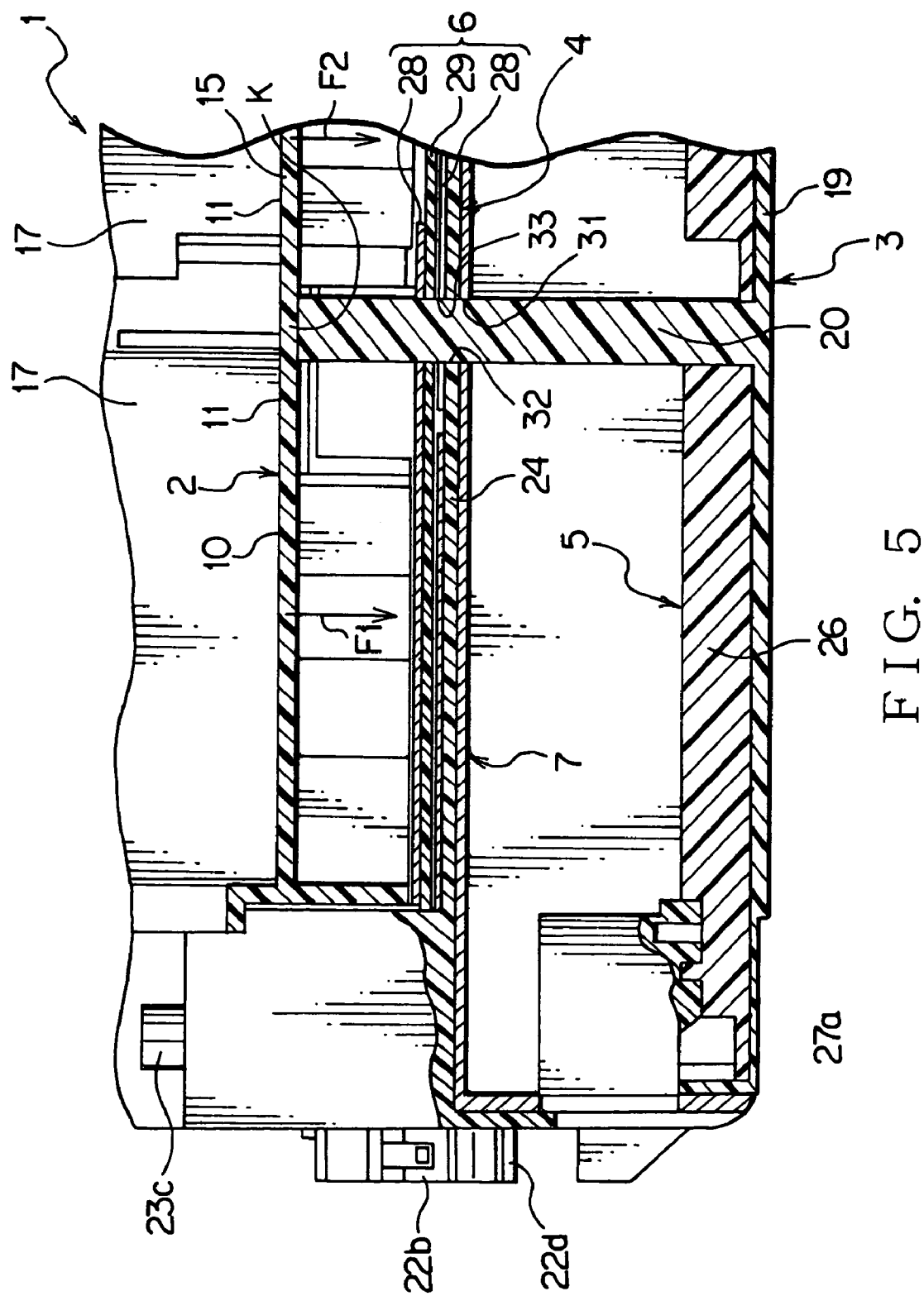
FIG. 5 is a partially expanded sectional view of a modified embodiment of the electric connecting box shown in FIG. 4.

In the first embodiment, the first strut 20 abuts on the shield plate 7. According to the present invention, the first strut 20 may be abuts directly on the upper cover 2, as shown in FIG. 5. In this case, the shield plate 7, the middle cover 4 and the wiring board 6 may have openings 31, 32, 33 for passing the first strut 20. When the relay 17 is mounted, the first strut 20 supports the force acting the upper cover 2 along the arrows F1, F2. Therefore, the upper cover 2 can be prevented from approaching the lower cover 3. Thus, the upper cover 2 and the lower cover 3 can be prevented from breakage and the printed wire board 5 can be prevented from deterioration of reliability.

The electric connecting box of the second embodiment according to the present invention will be described with reference to FIG. 6. The same portions as the first embodiment are put with the same marks and the description is omitted.

Figure 6:
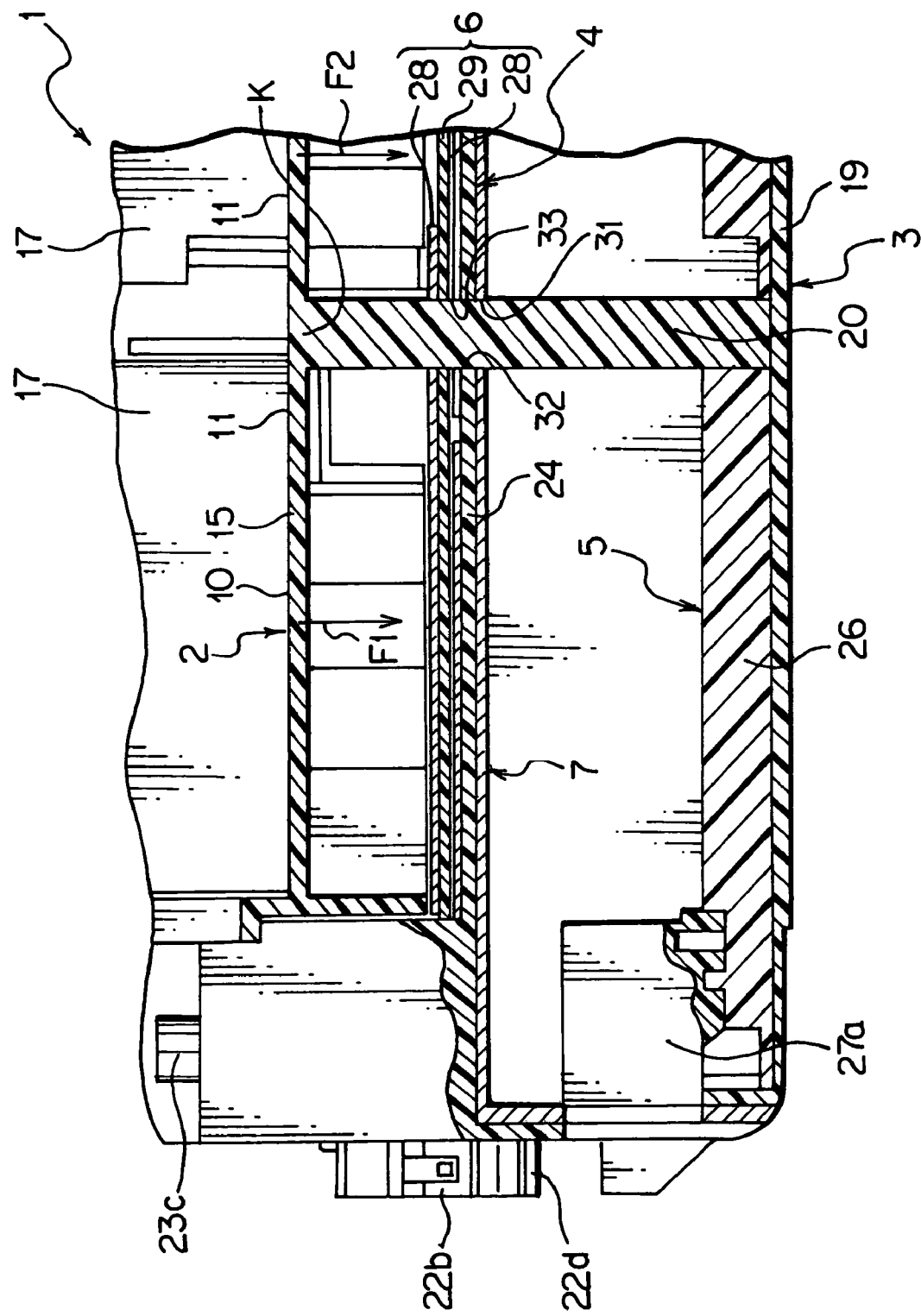
FIG. 6 is a partially expanded sectional view of the second embodiment of the electric connecting box.

According to the electric connecting box of the embodiment, the first strut 20 extends from the top wall 15 of the upper cover 2 toward the cover body 19 of the lower cover 3, as shown in FIG. 6. The first strut 20 is formed integrally with the upper cover 2 and abuts on the lower cover 3.

The first strut 20 of this embodiment also supports the force acting on the upper cover 2 along the arrows F1, F2 when the relay 17 is mounted, as same as the first embodiment. Therefore, the upper cover 2 can be prevented from approaching the lower cover 3. Thus, the upper cover 2 and the lower cover 3 can be prevented from breakage and the printed wire board 5 can be prevented from deterioration of reliability.

The first strut 20 of this embodiment also prevents the point K from approaching the lower cover 3. The printed wire board 5 as the first circuit unit and the wiring board 6 as the second circuit unit are provided so that the electric connecting box 1 can be used for multiple circuit systems.

Figure 7:
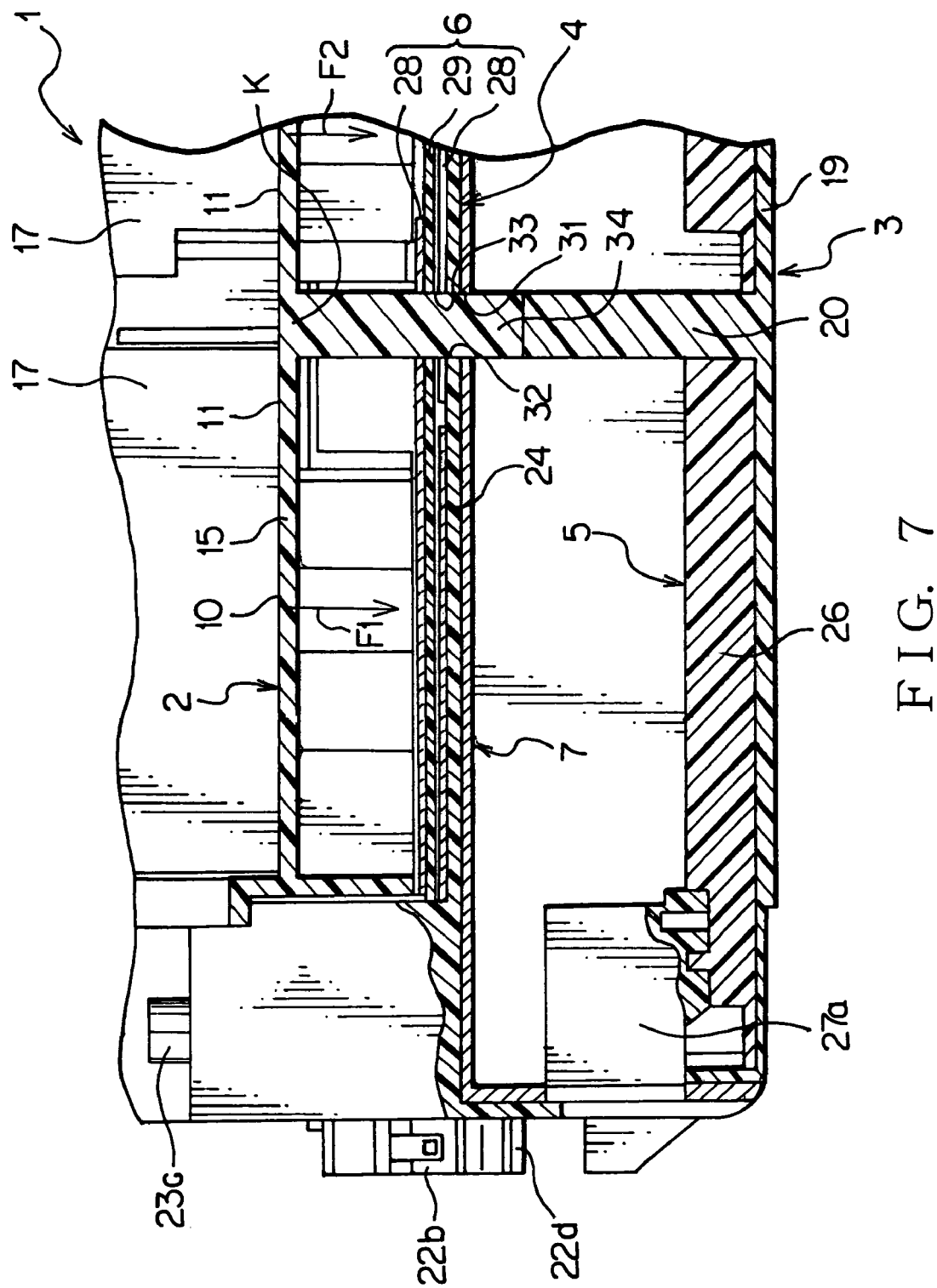
FIG. 7 is a partially expanded sectional view of the third embodiment of the electric connecting box.
Figure 8:
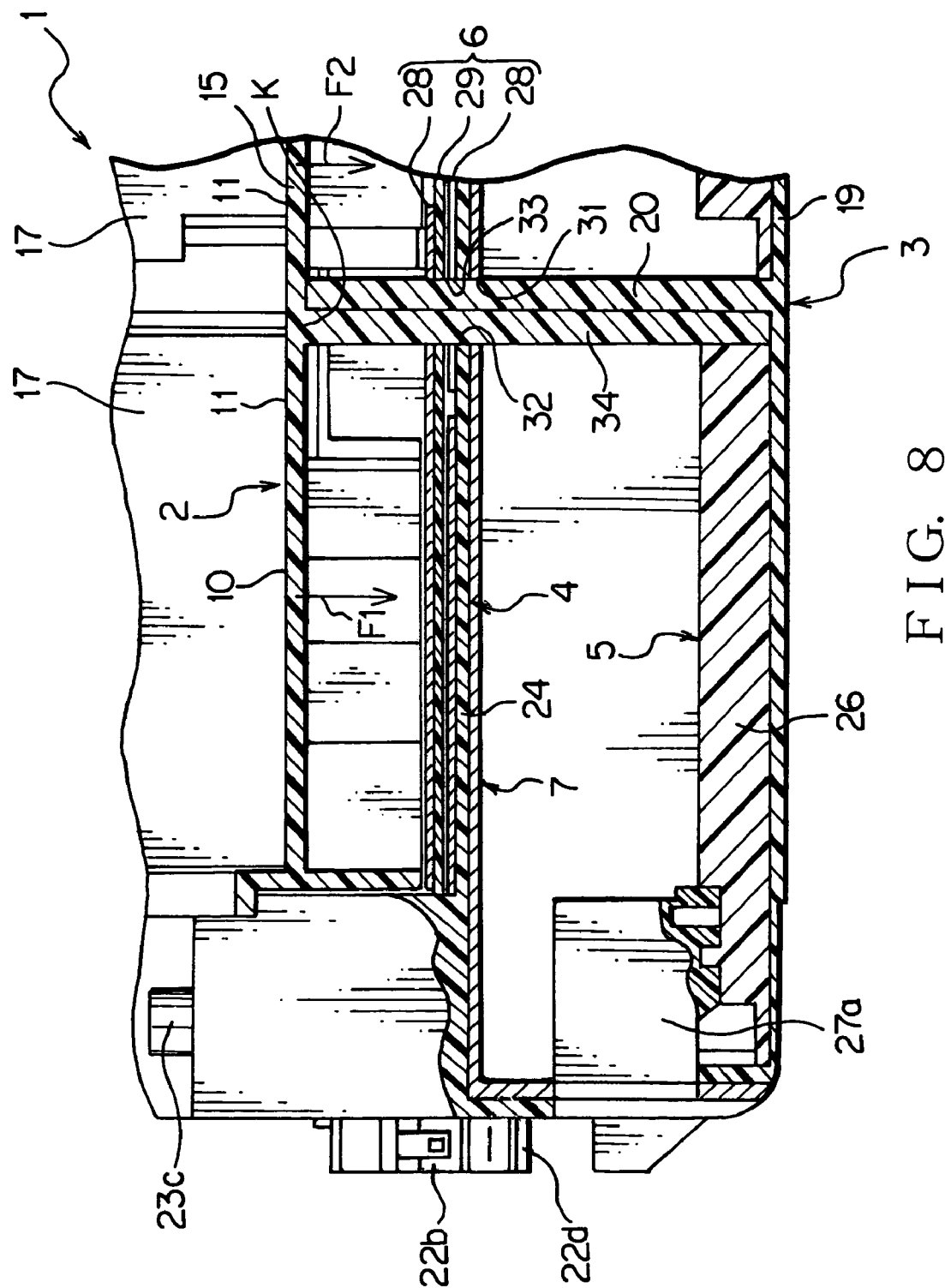
FIG. 8 is a partially expanded sectional view of a modified embodiment of the electric connecting box shown in FIG. 7.

The electric connecting box of the third embodiment according to the present invention will be described with reference to FIG. 7. The same portions as the first embodiment and the second embodiment are put with the same marks and the description is omitted.

The electric connecting box 1 according to this embodiment includes the first strut 20 extending from the cover body 19 of the lower cover 3 toward the top wall 15 of the upper cover 2 and a second strut 34 extending from the top wall 15 of the upper cover 2 toward the cover body 19 of the lower cover 3. The first strut 20 and the second strut 34 abut on each other at each end surface thereof. The first strut 20 is formed integrally with the lower cover 3, and the second strut 34 is formed integrally with the upper cover 2.

In this embodiment, similarly as the first and second embodiments, the first strut 20 and the second strut 34 support the force acting on the upper cover 2 along the arrows F1, F2, when the relay 17 is mounted. Therefore, the upper cover 2 can be prevented from approaching the lower cover 3. Thus, the upper cover 2 and the lower cover 3 can be prevented from breakage and the printed wire board 5 can be prevented from deterioration of reliability. The first strut 20 and the second strut 34 prevent the point K from approaching the lower cover 3. The printed wire board 5 as the first circuit unit and the wiring board 6 as the second circuit unit are provided so that the electric connecting box 1 can be used for multiple circuit systems.

In the third embodiment, the first struts 20, 34 abut on each other at the end surfaces thereof. According to the present invention, the first strut 20 may abut on the top wall 15 of the upper cover 2 and the second strut 34 may abut on the cover body 19 of the lower cover 3. In this case, the first strut 20 and the second strut 34 also support the force acting on the upper cover 2 along the arrows F1, F2, when the relay 17 is mounted. Therefore, the upper cover 2 can be prevented from approaching the lower cover 3. Thus, the upper cover 2 and the lower cover 3 can be prevented from breakage and the printed wire board 5 can be prevented from deterioration of reliability.

According to this embodiment, when the relay 17 is mounted, the first strut 20 and the second strut 34 prevent the upper cover 2 and the lower cover 3 from breakage. According to the present invention, when the fuse and a fusible link are mounted, the struts 20, 34 may prevent the upper cover 2 and the lower cover 3 from breakage.

The aforesaid embodiment shows a situation in which the two relays 17 are mounted. According to the present invention, one relay 17 or three or more relays 17 as the electric components may be mounted. By disposing the struts 20, 34 among the relays 17 as the three or more electric components, the struts 20, 34 may limit the point K among the relays 17 as the three or more electric components from approaching to the lower cover 3.

In the above embodiment, each one of struts 20 and 34 is provided. According to the present invention, a plurality of struts 20 or 34 can be provided.

In the above embodiment, the printed wire board 5 as the first circuit unit and the wiring board as the second circuit board are electrically independent from each other. According to the present invention, the printed wire board 5 as the first circuit unit and the wiring board as the second circuit board may be electrically connected.

In the above embodiment, the struts 20, 34 are formed integrally with one of the upper cover 2 and the lower cover 3. According to the present invention, the struts 20, 34 may be formed separately both from the upper cover 2 and the lower cover 3.

In the above embodiment, the printed wire board 5 is used as the first circuit unit, and the wiring board 6 is used as the second circuit unit. According to the present invention, the first circuit unit and the second circuit unit may have a various structure. In the present invention, the circuit unit may be a unit for connecting electrically the other electric devices through the connectors 12*a*, 12*b*, 22*a*, 22*b*, 22*c*, 22*d*, 27*a*, 27*b* and 27*c*.

Having now fully described the invention, it will be apparent to one of ordinary skill in the art that many changes and modifications can be made thereto without departing from the scope of the present invention as defined by the following claims.

What is claimed is:

1. An electric connecting box, having an upper cover, with a top wall and side walls, for mounting an electric component thereon and a lower cover, having a cover body, being joined to the upper cover for receiving a first circuit unit between the upper cover and the lower cover said connecting box having, a first strut extending from one of the top wall of the upper cover between said side walls, and the cover body of the lower cover toward the other of the upper cover and the lower cover, whereby said first strut limits the upper cover from approaching to the lower cover when the electric component is mounted on the upper cover.

2. The electric connecting box according to claim 1, wherein a plurality of electric components can be mounted on said upper cover, wherein said first strut limits a point of the upper cover between at least two of the plurality of electric components from approaching to the lower cover.

3. The electric connecting box according to claim 1, further comprising:

a middle cover between the upper cover and the lower cover to be joined to the upper cover and the lower cover; and a second circuit unit being disposed between the middle cover and the upper cover and connecting electrically with the electric component;

wherein the first circuit unit is disposed between the middle cover and the lower cover.

4. An electric connecting box, having an upper cover, with a top wall and side walls, for mounting an electric component thereon and a lower cover, having a cover body, being joined to the upper cover for receiving a first circuit unit between the upper cover and the lower cover, comprising:

a first strut extending from the lower body of the lower cover toward the upper cover; and a second strut extending from the top wall of the upper cover, between said side walls, toward the lower cover;

whereby the first strut and the second strut both limit the upper cover from approaching to the lower cover when the electric component is mounted on the upper cover.

5. The electric connecting box according to claim 4, wherein a plurality of electric components can be mounted on said upper cover, wherein said first strut limits a point of the upper cover between at least two of the plurality of electric components from approaching to the lower cover.

6. The electric connecting box according to claim 4, further comprising:

a middle cover between the upper cover and the lower cover to be joined to the upper cover and the lower cover; and a second circuit unit being disposed between the middle cover and the upper cover and connecting electrically with the electric component;

wherein the first circuit unit is disposed between the middle cover and the lower cover.

* * * * *